(12) United States Patent
Biskeborn et al.

(10) Patent No.: US 10,607,639 B2
(45) Date of Patent: Mar. 31, 2020

(54) METHOD OF FORMING AN IN-SITU PROTECTIVE FILM

(71) Applicant: International Business Machines Corporation, Armonk, NY (US)

(72) Inventors: Robert G. Biskeborn, Hollister, CA (US); Jason Liang, Campbell, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/005,570

(22) Filed: Jun. 11, 2018

(65) Prior Publication Data

US 2018/0294004 A1    Oct. 11, 2018

Related U.S. Application Data

(62) Division of application No. 15/399,631, filed on Jan. 5, 2017, now Pat. No. 10,074,388.

(51) Int. Cl.
| | |
|---|---|
| *G11B 5/255* | (2006.01) |
| *G11B 5/40* | (2006.01) |
| *G11B 5/31* | (2006.01) |
| *G11B 5/29* | (2006.01) |
| *G11B 5/265* | (2006.01) |

(52) U.S. Cl.
CPC .......... *G11B 5/40* (2013.01); *G11B 5/255* (2013.01); *G11B 5/2651* (2013.01); *G11B 5/295* (2013.01); *G11B 5/3106* (2013.01); *G11B 5/3116* (2013.01); *G11B 5/3143* (2013.01); *G11B 5/3169* (2013.01)

(58) Field of Classification Search
CPC ....... G11B 5/255; G11B 5/295; G11B 5/2651; G11B 5/3143; G11B 5/3169; G11B 5/40

USPC .......................................................... 360/122
See application file for complete search history.

(56) References Cited

U.S. PATENT DOCUMENTS

| | | | |
|---|---|---|---|
| 6,788,497 | B1 | 9/2004 | Cates |
| 6,879,470 | B2 | 4/2005 | Johnson et al. |
| 7,097,923 | B2 | 8/2006 | Webb et al. |
| 7,381,484 | B2 | 6/2008 | Ejiri |
| 8,035,919 | B2 | 10/2011 | Yari et al. |
| 8,547,665 | B2 | 10/2013 | Biskeborn et al. |
| 8,811,127 | B1 | 8/2014 | Hirata et al. |
| 8,861,318 | B1 | 10/2014 | Lee et al. |
| 8,908,331 | B2 * | 12/2014 | Shimazawa ............ G11B 5/314 360/122 |
| 9,053,718 | B1 | 6/2015 | Adrong et al. |
| 9,311,954 | B1 * | 4/2016 | Li ........................ C23C 14/5853 |

(Continued)

FOREIGN PATENT DOCUMENTS

EP    581303 A2    2/1994

OTHER PUBLICATIONS

Biskeborn et al., U.S. Appl. No. 15/399,631, filed Jan. 5, 2017.

(Continued)

*Primary Examiner* — Jefferson A Evans
(74) *Attorney, Agent, or Firm* — Zilka-Kotab, P.C.

(57) ABSTRACT

A method according to one embodiment includes forming a wear-resistant in-situ film on a magnetic read transducer having a sensor with magnetic shields. The in-situ film including material derived from a flexible medium. The material is formed on the transducer by passing the flexible medium over the transducer at an elevated temperature.

20 Claims, 13 Drawing Sheets

(56) References Cited

U.S. PATENT DOCUMENTS

| | | |
|---|---|---|
| 10,074,388 B2 | 9/2018 | Biskeborn et al. |
| 2003/0074784 A1 | 4/2003 | Konishi et al. |
| 2003/0099069 A1 | 5/2003 | Kagami et al. |
| 2004/0037012 A1 | 2/2004 | Nakanishi et al. |
| 2005/0207069 A1* | 9/2005 | Suda .................... G11B 5/1272 360/323 |
| 2006/0232883 A1 | 10/2006 | Biskeborn et al. |
| 2008/0192380 A1 | 8/2008 | Dee |
| 2008/0266711 A1* | 10/2008 | Nibarger ............ G11B 5/00821 360/130.21 |
| 2009/0052093 A1* | 2/2009 | Kawakita ................ G11B 5/29 360/314 |
| 2009/0053394 A1* | 2/2009 | Yamakawa .......... G11B 5/8408 427/8 |
| 2009/0135520 A1 | 5/2009 | Hachisuka |
| 2009/0268335 A1* | 10/2009 | Huang ................ G11B 5/3133 360/75 |
| 2010/0053817 A1 | 3/2010 | Biskeborn et al. |
| 2011/0285394 A1* | 11/2011 | Iben ....................... B82Y 25/00 324/252 |
| 2014/0063646 A1 | 3/2014 | Biskeborn et al. |
| 2015/0138673 A1 | 5/2015 | Adrong et al. |
| 2017/0236533 A1 | 8/2017 | Li et al. |
| 2017/0261546 A1* | 9/2017 | Eagen ................ G01R 31/2872 |
| 2018/0040341 A1 | 2/2018 | Rejda et al. |
| 2018/0190315 A1 | 7/2018 | Biskeborn et al. |
| 2018/0294005 A1 | 10/2018 | Biskeborn et al. |
| 2019/0066719 A1* | 2/2019 | Macken ................... G11B 5/40 |

OTHER PUBLICATIONS

Rismani et al., "Development of a ta-C Wear Resistant Coating with Composite Interlayer for Recording Heads of Magnetic Tape Drives," Tribol Lett, Apr. 1, 2012, No. 46, pp. 221-232.
Restriction Requirement from U.S. Appl. No. 15/399,631, dated Jun. 8, 2017.
Non-Final Office Action from U.S. Appl. No. 15/399,631, dated Sep. 25, 2017.
Notice of Allowance from U.S. Appl. No. 15/399,631, dated May 7, 2018.
Biskeborn et al., U.S. Appl. No. 16/005,577, filed Jun. 11, 2018.
List of IBM Patents or Patent Applications Treated As Related.
Non-Final Office Action from U.S. Appl. No. 16/005,577, dated Apr. 4, 2019.
Final Office Action from U.S. Appl. No. 16/005,577, dated Sep. 26, 2019.
Notice of Allowance from U.S. Appl. No. 16/005,577, dated Nov. 27, 2019.
Notice of Allowance from U.S. Appl. No. 16/005,577, dated Jan. 27, 2020.

\* cited by examiner

Height of deposit on sensor = 13.0 nm

METHOD OF FORMING AN IN-SITU PROTECTIVE FILM

BACKGROUND

The present invention relates to data storage systems, and more particularly, this invention relates to wear-resistant in-situ films for magnetic read transducers.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

A method according to one embodiment includes forming a wear-resistant in-situ film on a magnetic read transducer having a sensor with magnetic shields. The in-situ film including material derived from a flexible medium. The material is formed on the transducer by passing the flexible medium over the transducer at an elevated temperature.

A method according to another embodiment includes determining resistances of read transducers, and comparing the determined resistances to previously-stored resistance values. In response to determining that the measured resistances have significantly changed from the previously-stored resistance values, the read transducers are caused heated to above a normal operation temperature, and a flexible medium is run over the transducers for forming a wear-resistant in-situ film om the read transducers.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a magnetic read transducer comprised of a sensing portion and proximate magnetic shields, and a wear-resistant in-situ film on a media-facing side of the read transducer. The in-situ film is comprised of material derived from a flexible medium. The in-situ film is primarily above the read transducer.

In another general embodiment, a method includes forming a wear-resistant in-situ film on a magnetic read transducer having a sensor with magnetic shields. The in-situ film including material derived from a flexible medium. The material is formed on the transducer by passing the flexible medium over the transducer at an elevated temperature.

In yet another general embodiment, a method includes determining resistances of read transducers, and comparing the measured resistances to previously-stored resistance values. In response to determining that the determined resistances have significantly changed from the previously-stored resistance values, the read transducers are caused heated to above a normal operation temperature, and a flexible medium is run over the transducers for forming a wear-resistant in-situ film om the read transducers.

Figure 1A:
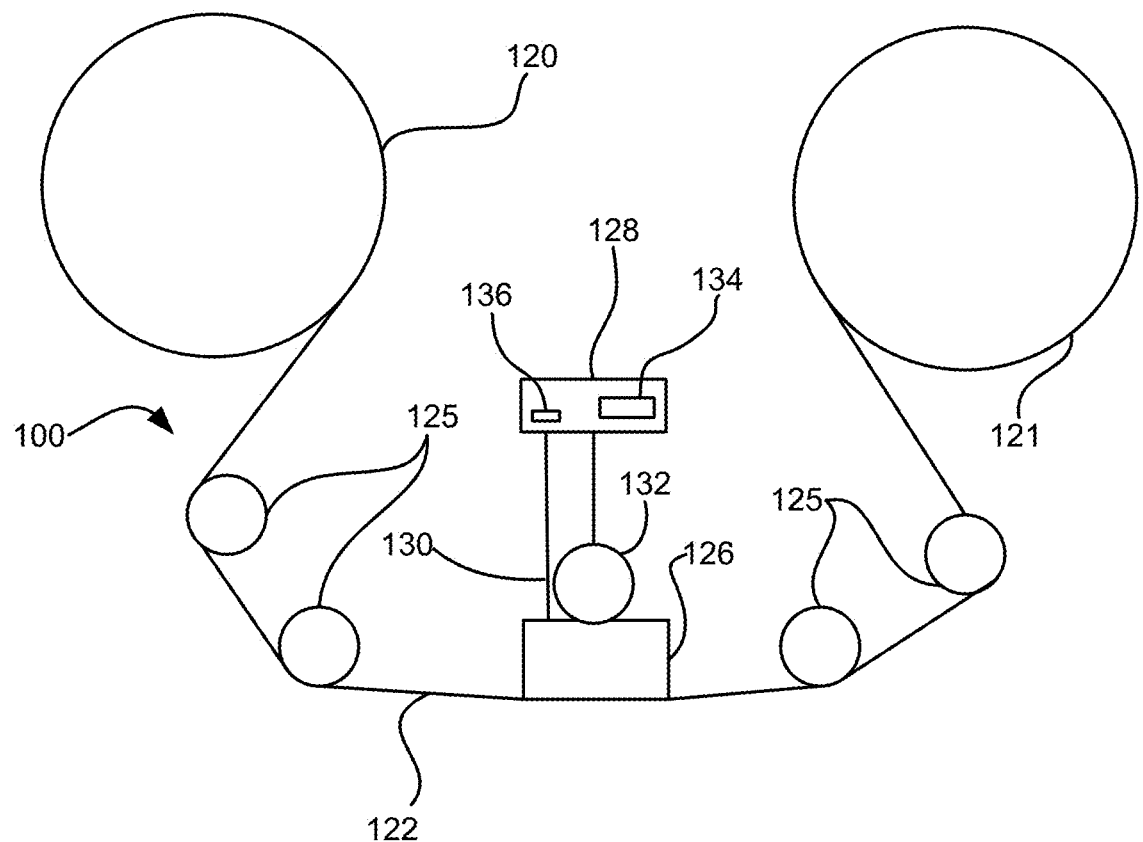
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
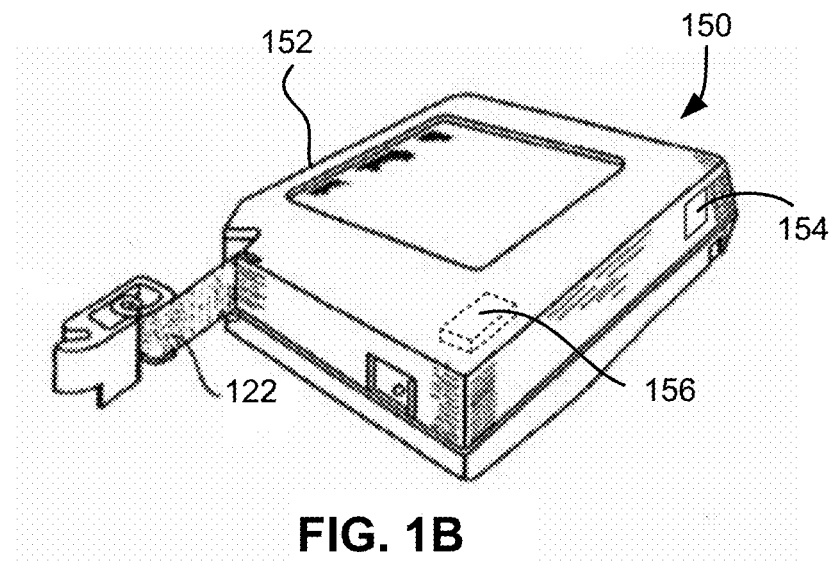
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or another device.

Figure 2:
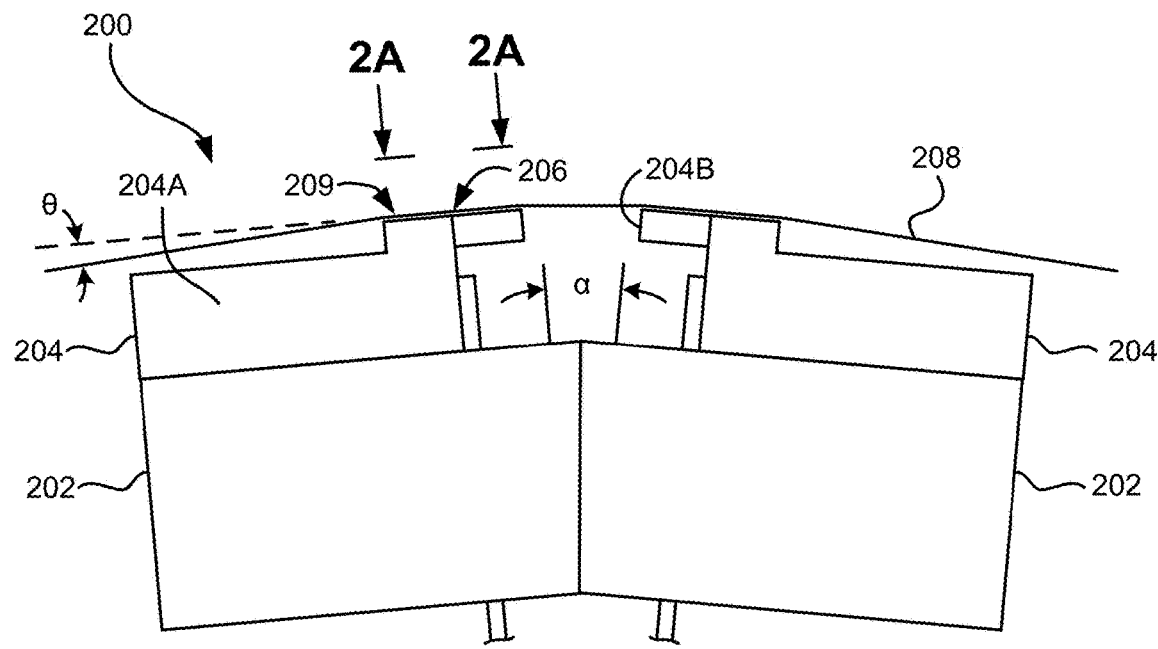
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
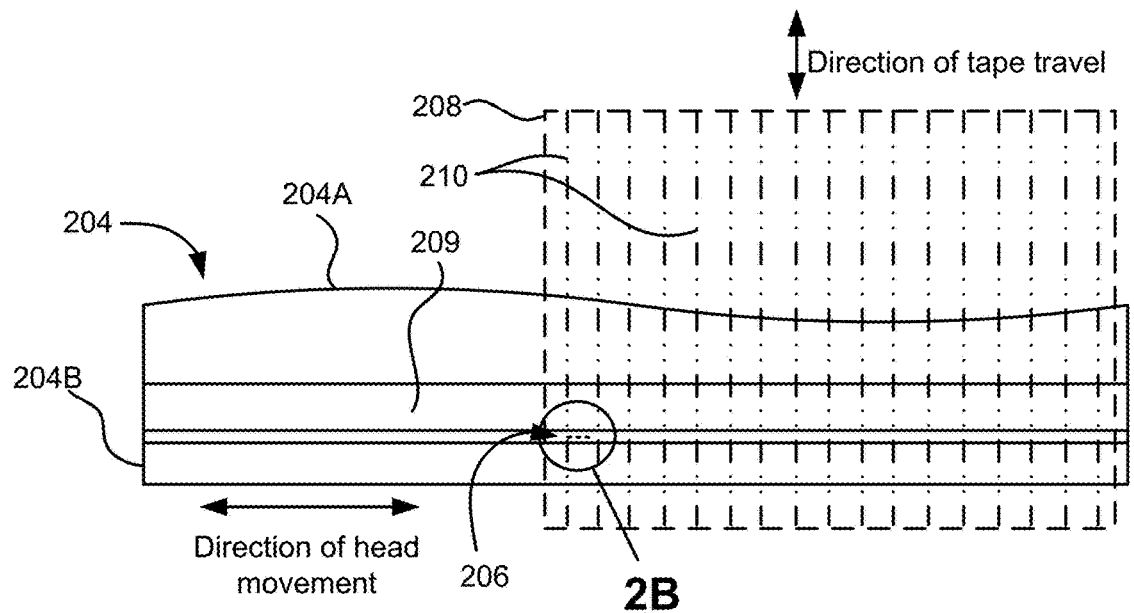
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
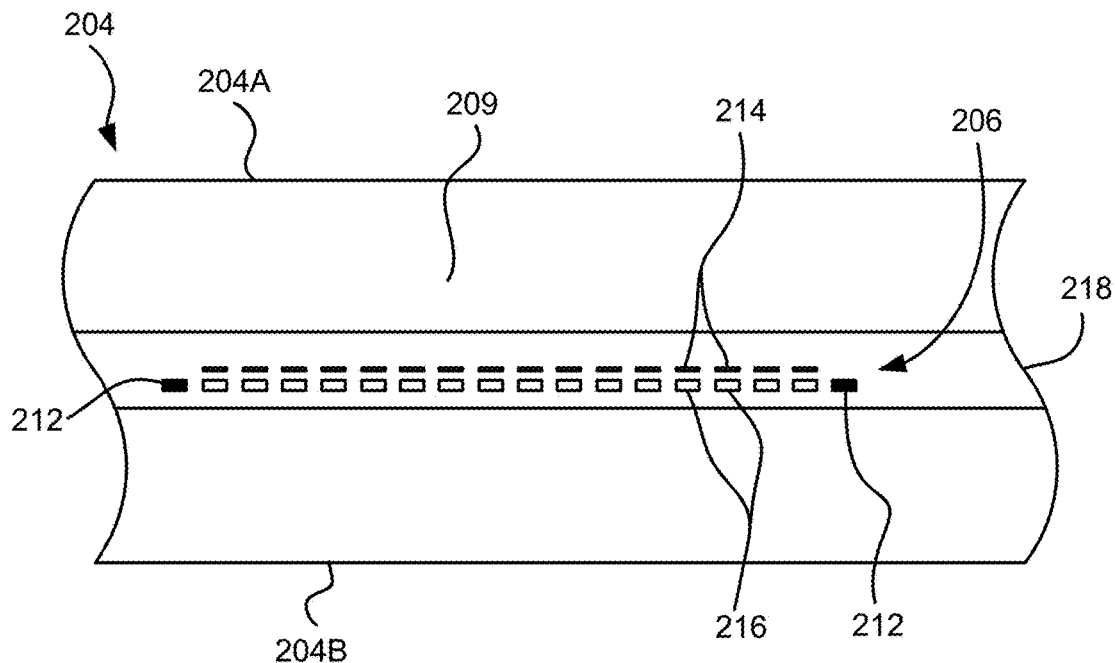
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary.

Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
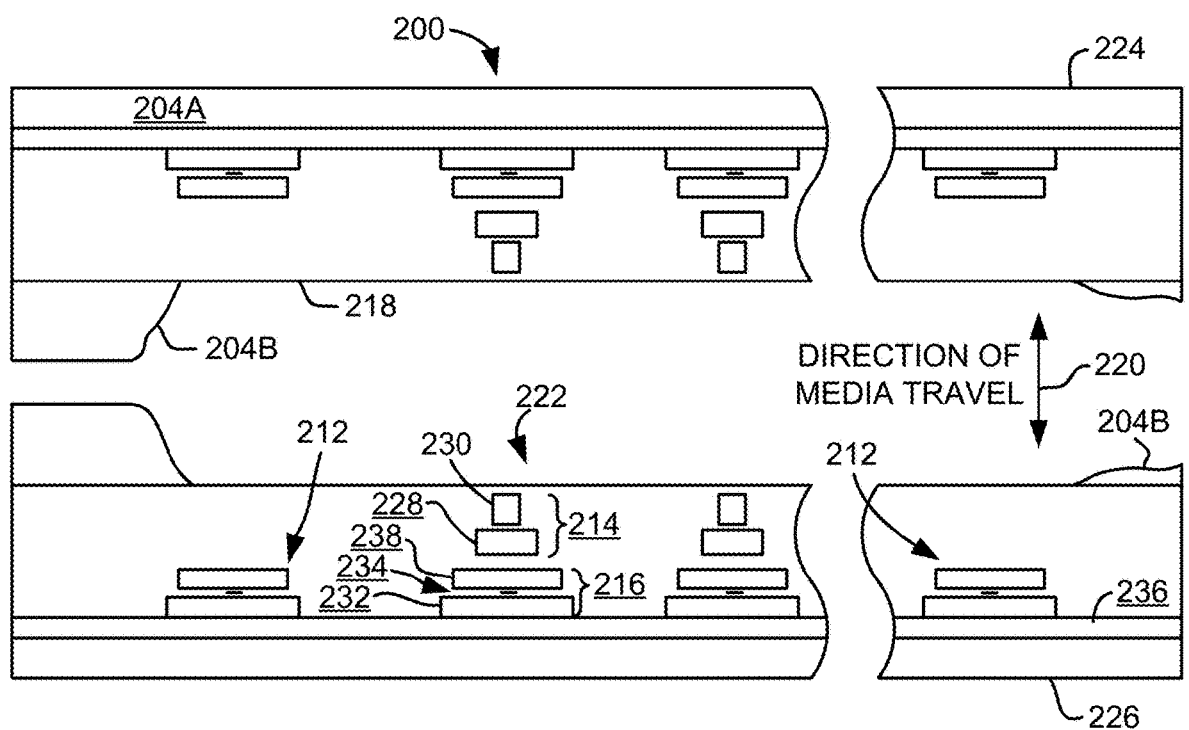
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
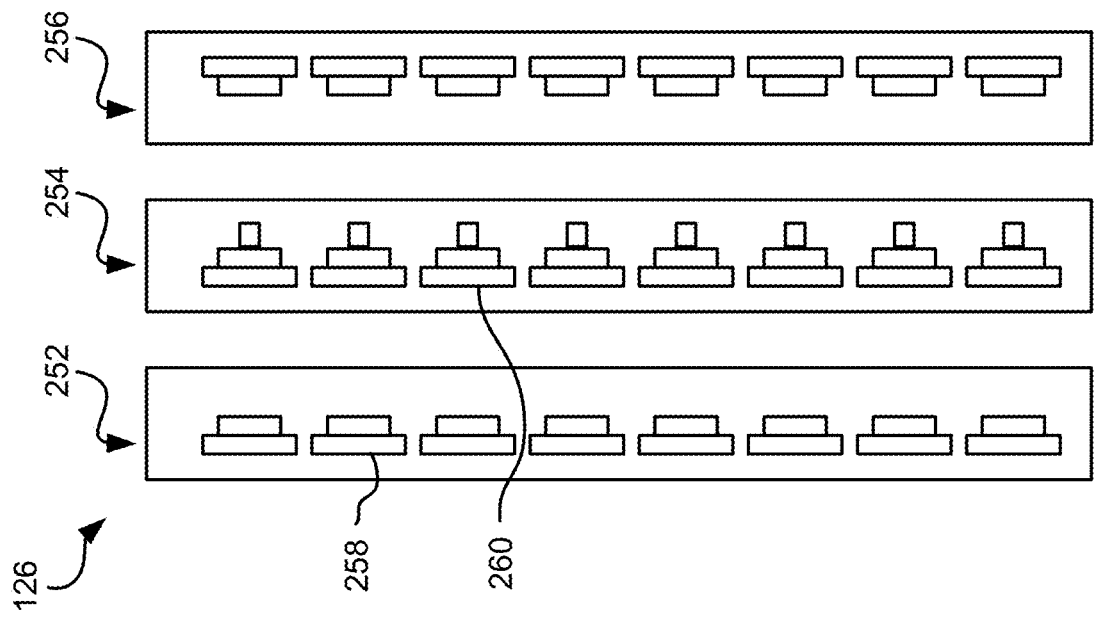
FIG. 4 is a partial tape bearing surface view of a magnetic head having a read-write-read configuration.
Figure 3:
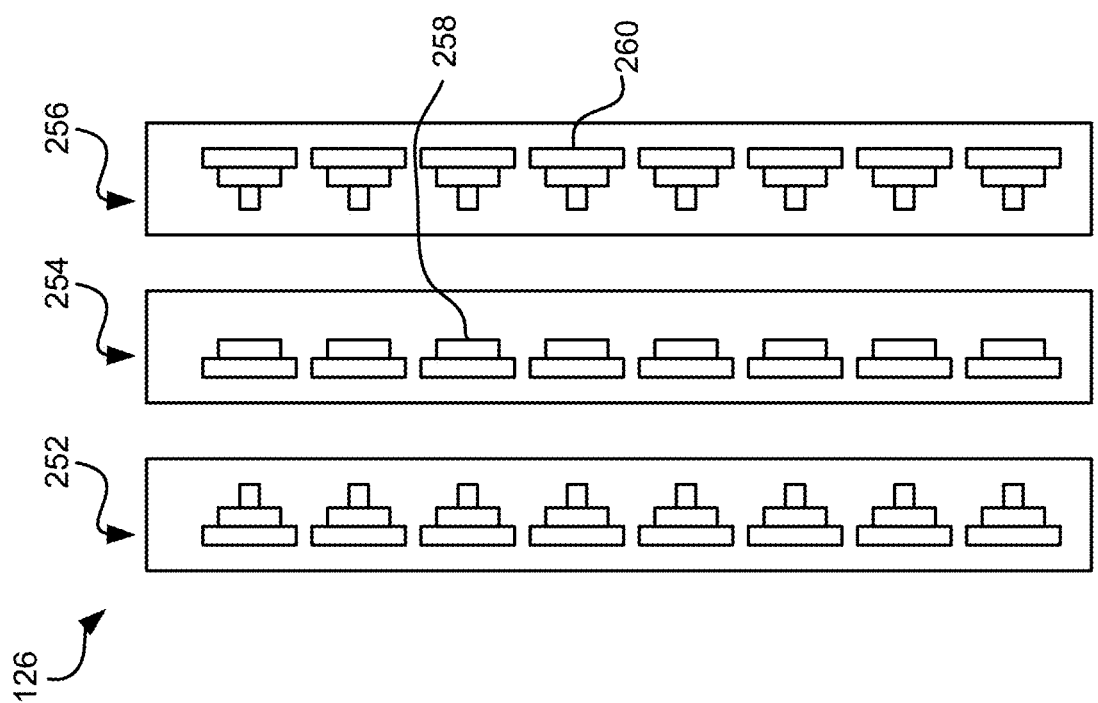
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
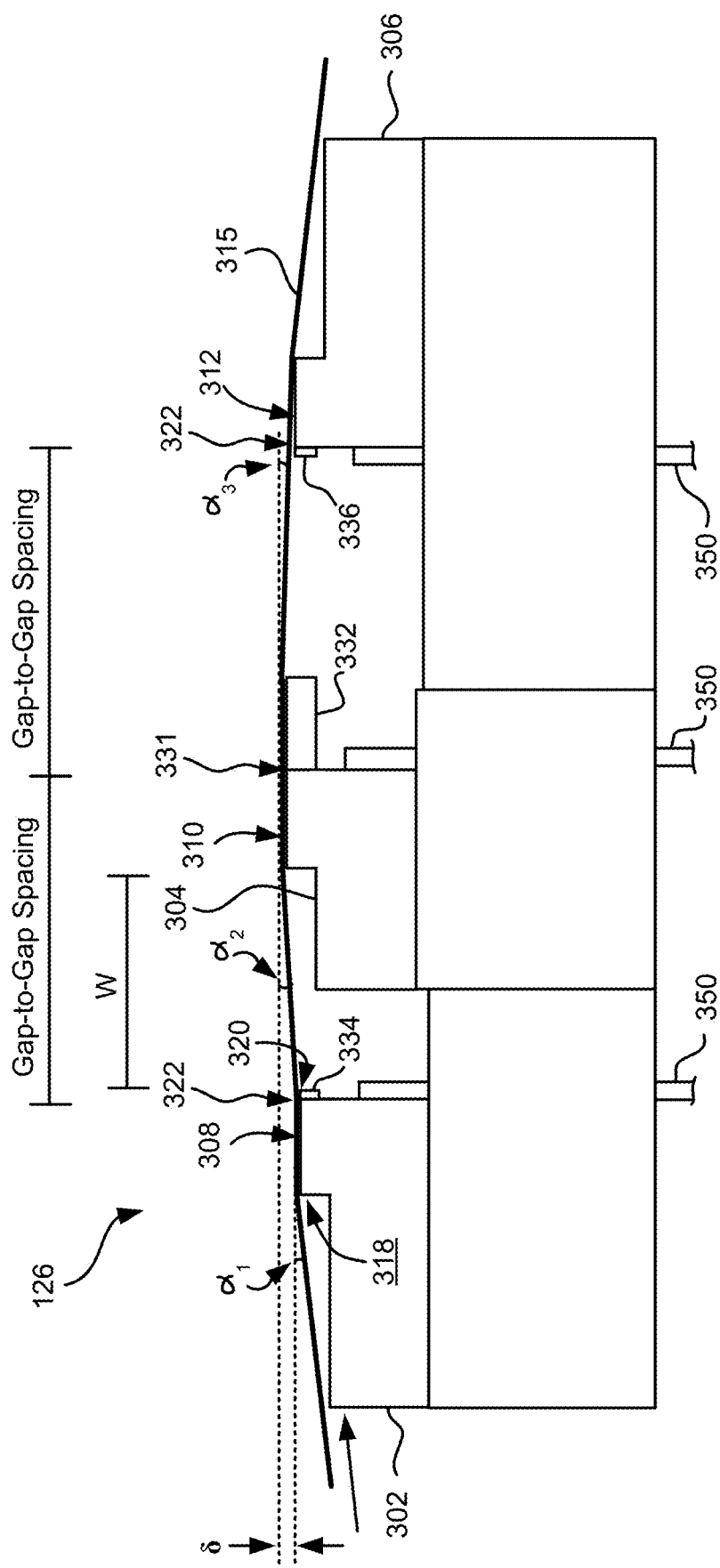
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also, note that the outer modules 302, 306 will alternate as leading modules, depending on the direction of travel of the tape 315.

Figure 6:
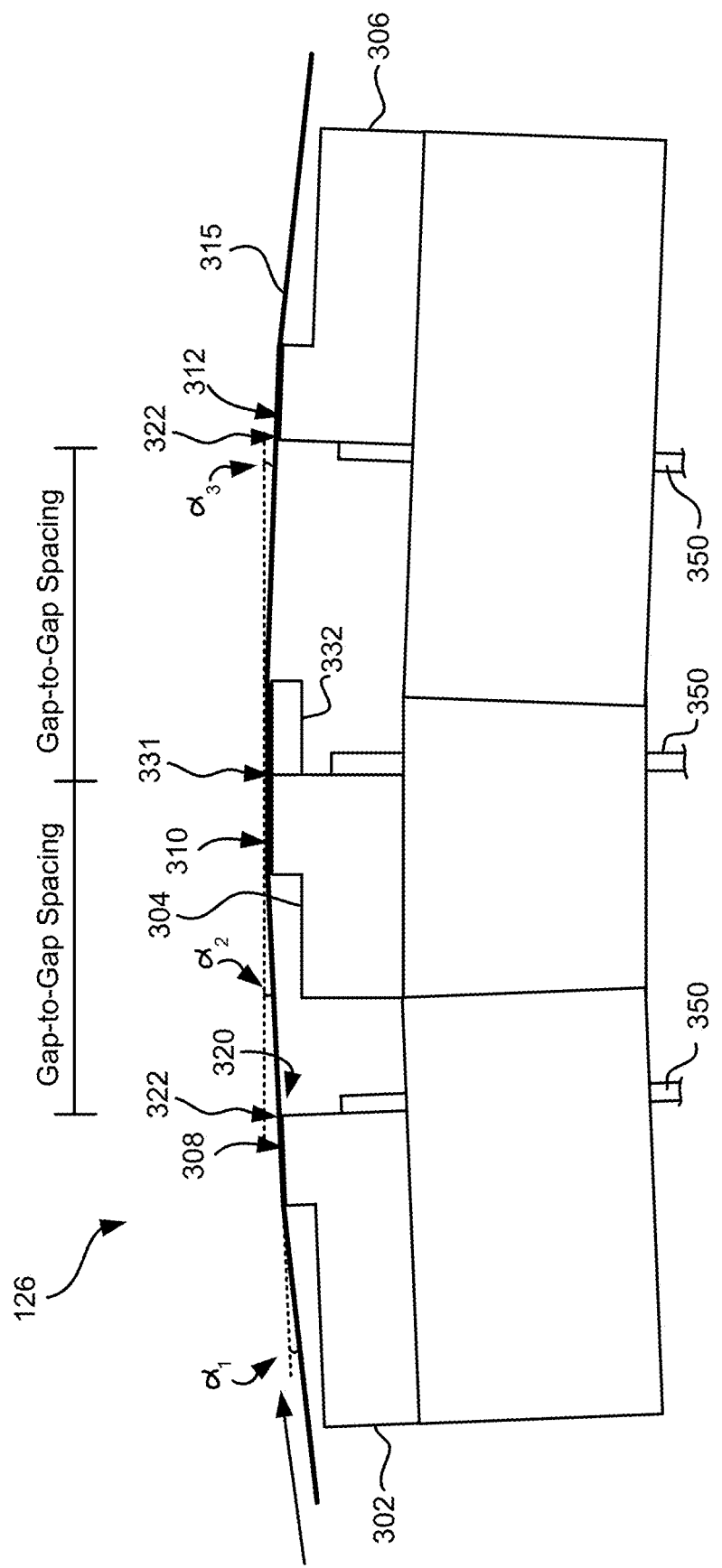
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
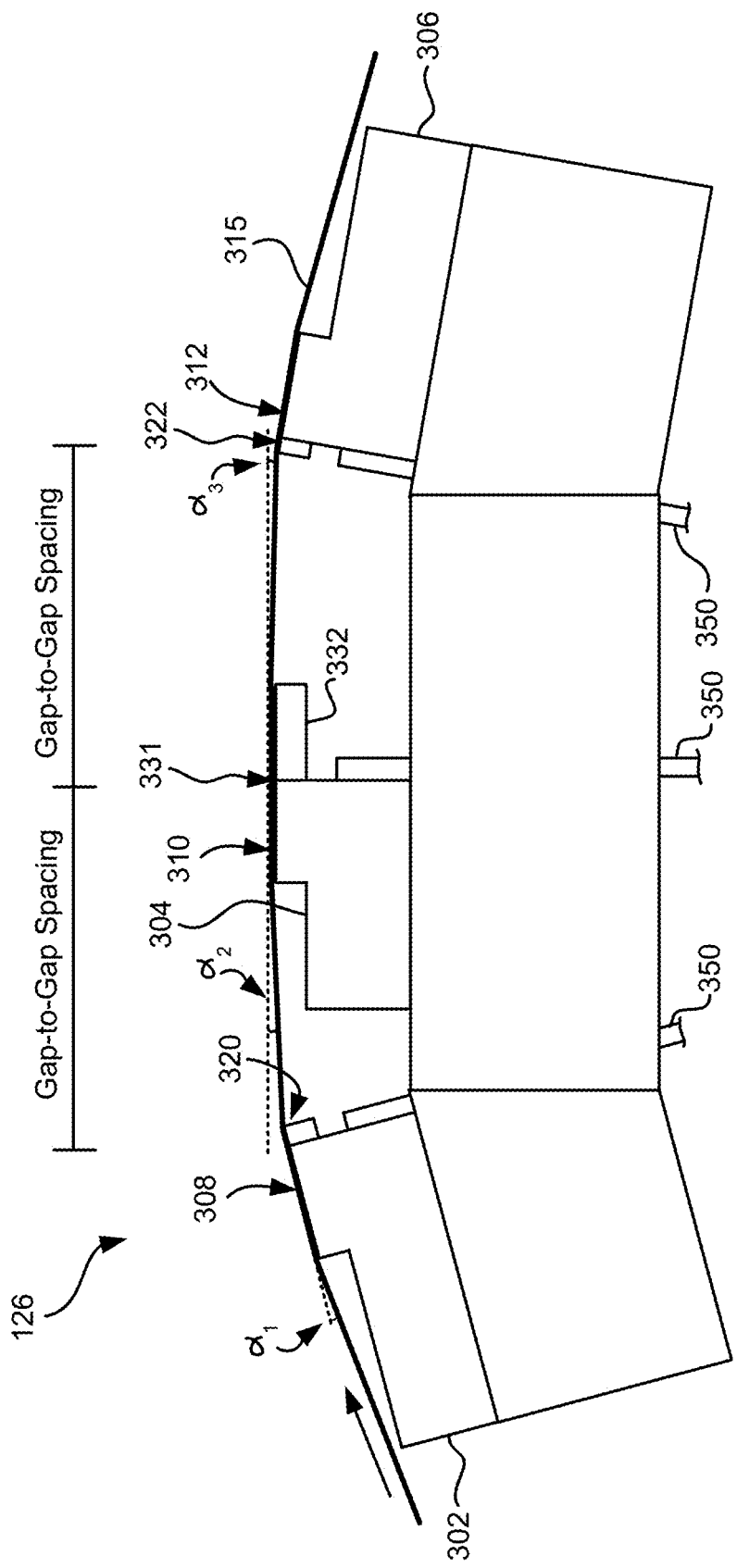
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Read transducers benefit from reduced head-tape spacing, which in turn translates into increased aerial density. In addition, protective coatings on the read transducers are critical for shielding the sensors from corrosion due to harsh environments, shorting due to smearing, and wear due to abrasive media. Conventional methods of applying a protective layer include coating uniformly the entire surface of the head. These methods and resulting protected heads provide durability of the heads but the extensive coating on the head may create magnetic spacing loss that may contribute to degradation of performance. Thus, efficient coating of the sensor may improve resolution of the read transducers.

Figure 8:
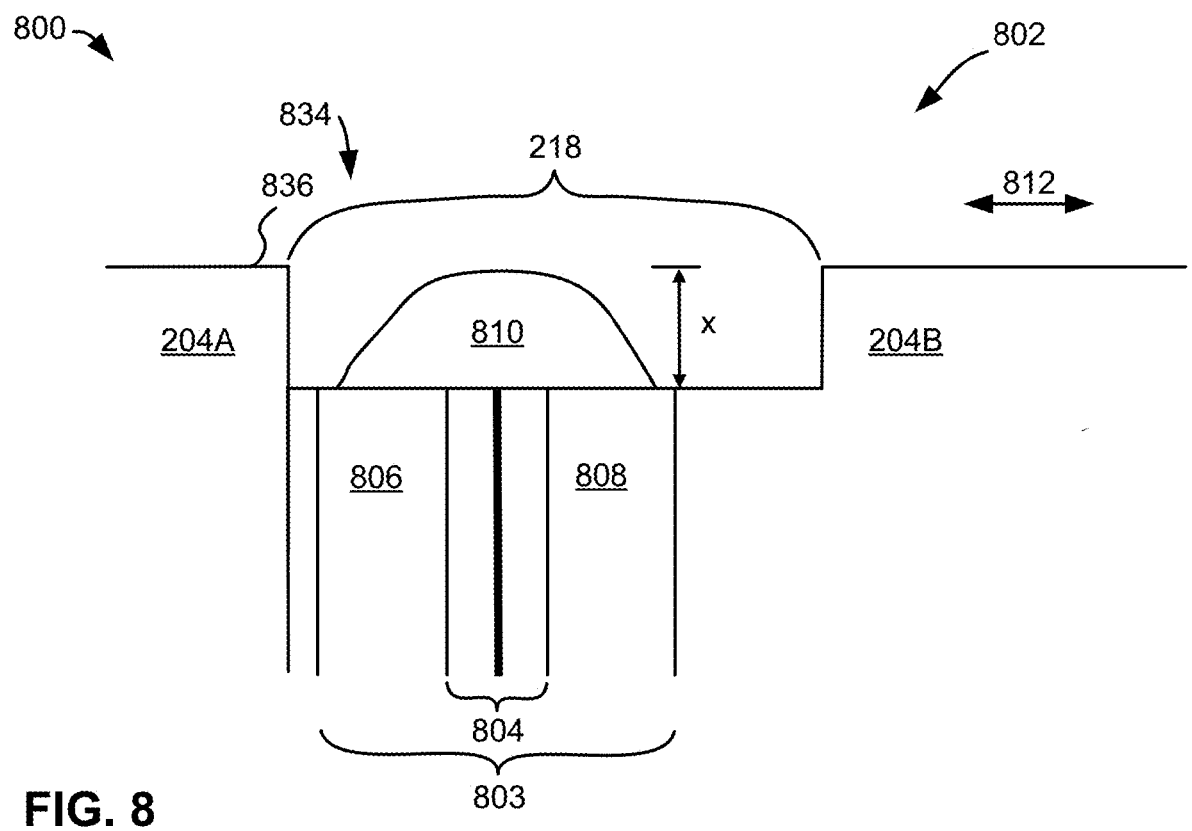
FIG. 8 is a side view of a magnetic tape head according to one embodiment.

FIG. 8 depicts an apparatus 800, in accordance with one embodiment. As an option, the present apparatus 800 may be implemented in conjunction with features from any other embodiment listed herein, such as those described with reference to the other FIGS. Of course, however, apparatus 800 and others presented herein may be used in various applications and/or in permutations which may or may not be specifically described in the illustrative embodiments listed herein. Further, the apparatus 800 presented herein may be used in any desired environment.

Apparatus 800 includes a module 802 that has a magnetic read transducer 803. Although FIG. 8 illustrates only a single magnetic read transducer 803, apparatus 800 may include one or more additional magnetic read transducers on a remainder of the module 802, e.g., in an array such as in FIGS. 2B-4. Accordingly, the components and/or configurations of magnetic read transducer 803 may be incorporated in any apparatus described herein.

According to some embodiments, the read transducer 803 may be configured as a data sensor for reading data tracks of a magnetic medium. According to other embodiments, the read transducer 803 may be configured as a servo sensor for reading servo tracks of a magnetic medium.

The magnetic read transducer 803 includes magnetic shields 806, 808 on opposite sides of a sensor 804 (e.g. such as a TMR sensor, GMR sensor, etc.) in an intended direction 812 of media travel thereacross. The upper shield 808 may be positioned above the lower shield 806 (e.g., in a deposition direction thereof). As would be appreciated by one skilled in the art, upper and lower shields 806, 808 preferably provide magnetic shielding for the sensor 804. Thus, one or both of the upper and lower shields 806, 808 may desirably include a magnetic material of a type known in the art, for example, permalloy, e.g., a ferromagnetic alloy of nickel and iron.

An apparatus having a module 802 according to one embodiment may have a wear-resistant in-situ film 810 on the read transducer 803. The in-situ film 810 is preferably more wear-resistant than permalloy due to the in-situ film having one or more of the following characteristics: higher hardness than permalloy, lower ductility than permalloy, and higher Young's modulus (modulus of elasticity) than permalloy. Note that permalloy may or may not be present in the thin films of the reader, but is a typical component in many embodiments. The apparatus according to various approaches may be configured as described herein, and/or in any conventional configuration. Referring to FIG. 8, an apparatus 800 having a gap 218 is shown according to one embodiment. The substrate 204A and closure 204B may form portions of a media bearing surface 836, and may further define a thin film region which may include multiple thin films which may reside in a gap, such as gap 218 shown in FIG. 8. The gap 218 may include an array of transducers, including anisotropic magnetoresistive (AMR), giant magnetoresistive (GMR), tunneling magnetoresistive (TMR), or colossal magnetoresistive (CMR) sensors and/or writers, each separated by sufficient insulator layers, shield layers, and/or pole layers so that the array of transducers may function as readers and/or writers in read or write operations when used in a magnetic head. Moreover, any of the sensors may have a current-in-plane (CIP) or current-perpendicular-to-plane (CPP) configuration. The substrate and transducers, if not recessed relative to the substrate, may form portions of a planar tape media bearing surface 836.

In an exemplary embodiment as shown in FIG. 8, an apparatus 800 includes a magnetic read transducer 803 having a sensor 804 flanked by shields 806, 808 and may include a wear-resistant in-situ film 810 on a media-facing side 834 of the read transducer 803. The in-situ film 810 may include deposits of material from a flexible medium that travels in the direction 812 of media travel across the tape bearing surface. In addition, the in-situ film 810 may be primarily (>50 vol %) above the read transducer 803. For example, greater than 80% of the volume of the in-situ film 810 may be positioned above the read transducer 803. In some approaches, the in-situ film 810 may be primarily above the sensor 804 itself.

Furthermore, the in-situ film may extend along the media-facing side 834 beyond at least one of the shields 806, 808 in an intended direction 812 of media travel thereacross. In one approach, the in-situ film 810 may extend along the media-facing side 834 beyond both shields 806, 808 in an intended direction 812 of media travel thereacross. In some approaches (not shown), the in-situ film may extend all the way within the gap between the substrate and the closure. However, in a preferred approach, the in-situ film 810 does not extend along the media-facing side 834 beyond the shields 806, 808, e.g., as shown in FIG. 8.

Figure 9:
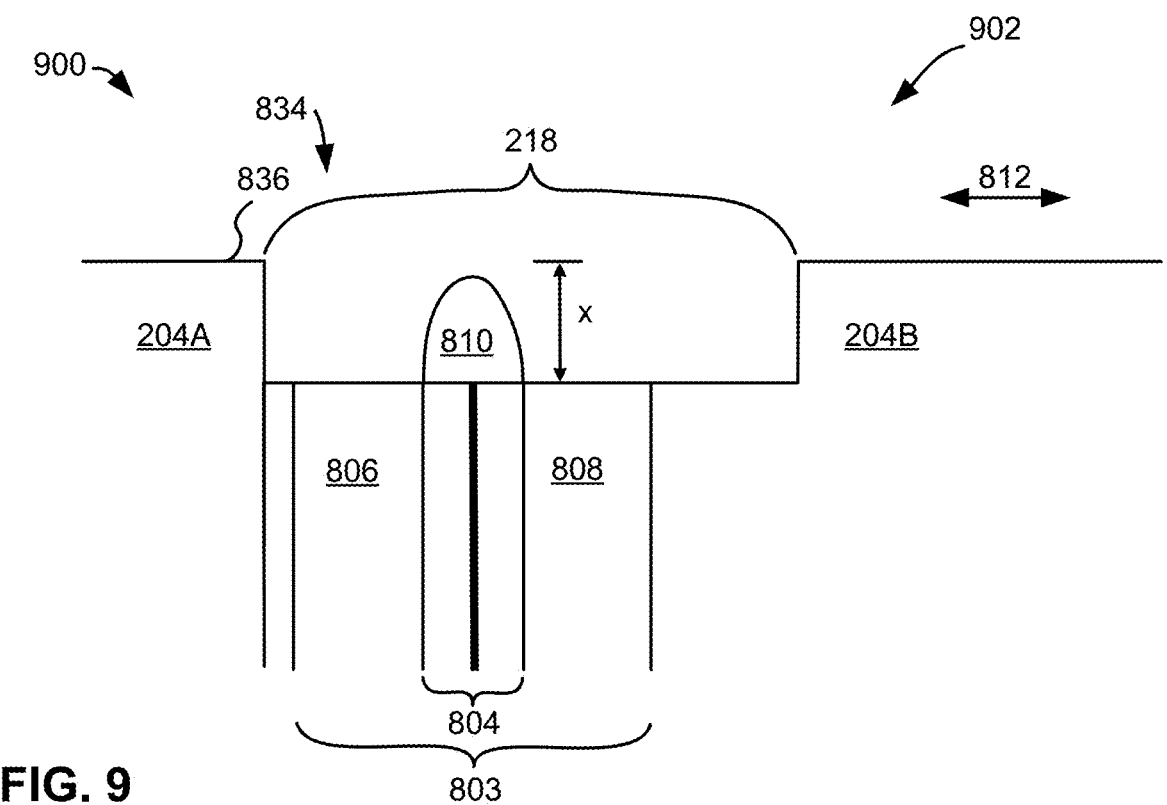
FIG. 9 is a side view of a magnetic tape head according to one embodiment.

FIG. 9 depicts an apparatus 900, in accordance with one embodiment. As an option, the present apparatus 900 may be implemented in conjunction with features from any other embodiment listed herein, such as those described with reference to the other FIGS. Of course, however, apparatus 900 and others presented herein may be used in various applications and/or in permutations which may or may not be specifically described in the illustrative embodiments listed herein. Further, the apparatus 900 presented herein may be used in any desired environment.

In one embodiment, as depicted in FIG. 9, the apparatus 900 has a module 902 that includes a transducer 803 that may have an in-situ film 810 extending along the media-facing side 834 of a sensor 804. Moreover, in the embodiment shown in FIG. 9, the in-situ film 810 may about to the shields 806, 808 in an intended direction 812 of media travel thereacross. In another embodiment, the in-situ film 810 may not extend beyond the region between the shields 806, 808 in an intended direction 812 of media travel thereacross.

As mentioned above, in various embodiments, the read transducer 803 may be one of an array of read transducers where the in-situ film 810 may be on media-facing sides 834 of the read transducers 803.

The in-situ film 810 may include material from a flexible medium that travels across the read transducer 803 in the direction 812 of media travel. The flexible medium may be a tape in some embodiments. In various approaches, the flexible medium may be a magnetic tape.

In various embodiments, e.g., such as those shown in FIGS. 8 and 9, the in-situ film 810 may include iron oxide. In other approaches, the in-situ film 810 may include the wear-resistant material, along with a lubricant and/or other components of flexible medium that travels across the transducer 803.

In various embodiments, the transducer 803 may have a first coating 832 (FIG. 10) of conventional protective material above the transducer 803 that provides a uniform coating on the entire surface 836 of the module, or in the gap 218, and an in-situ film 810 thereabove.

Figure 10:
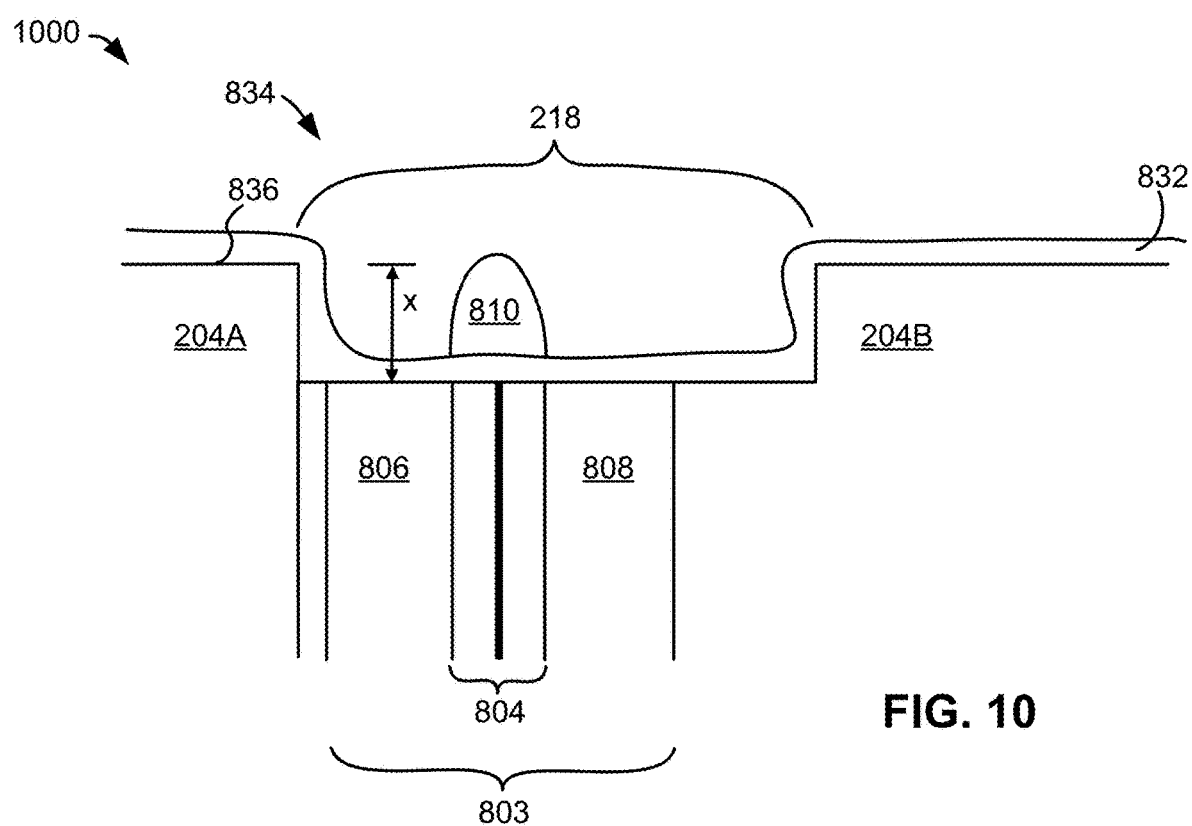
FIG. 10 is a side view of a magnetic tape head according to one embodiment.

FIG. 10 depicts an apparatus 1000, in accordance with one embodiment. As an option, the present apparatus 1000 may be implemented in conjunction with features from any other embodiment listed herein, such as those described with reference to the other FIGS. Of course, however, apparatus 1000 and others presented herein may be used in various applications and/or in permutations which may or may not be specifically described in the illustrative embodiments listed herein. Further, the apparatus 1000 presented herein may be used in any desired environment.

According to one embodiment as shown in FIG. 10, the apparatus 1000 includes a read transducer 803 that may have an alumina coating 832 on and extending along the media-facing side 834 of the read transducer 803 where the in-situ film 810 may be above the alumina coating 832. In some approaches, the in-situ film 810 above the alumina coating 832 may extend no further than the shields 806, 808 on opposite sides of the read transducer 803, e.g., may extend about to the shield as shown in FIG. 9. In other approaches, the in-situ film 810 above the alumina coating 832 may extend above the shields 806, 808 (not shown). In yet another approach, the in-situ film 810 above the alumina coating 832 may extend beyond the shields 806, 808 within the gap 218 between the substrate 204A and closure 204B (not shown).

As shown in each embodiment of FIGS. 8, 9 and 10, the read transducer 803 may be positioned between a substrate 204A and a closure 204B where a media-facing side 834 of the closure 204B and a media-facing side 834 of the substrate 204A may extend along a common plane (for example, the tape bearing surface 836). In addition, the media-facing side 834 of the read transducer 803 may be recessed by a distance x from a plane extending along the media-facing side 834 of the substrate 204A such that the in-situ film 810 may have a thickness above the read transducer 803 that may not be greater than the distance x of recession from the plane extending along the media-facing side 834 of the substrate 204A. In some approaches, the illustrative thickness of coating 810 may be least a quarter of the distance (0.25x). In other approaches, the thickness of the coating 810 may be at least half the distance (0.50x). In yet other approaches, the thickness of the coating 810 may be any distance up to x.

In an exemplary embodiment, the in-situ film 810 may have a thickness of at least 5 nm.

Figure 11:
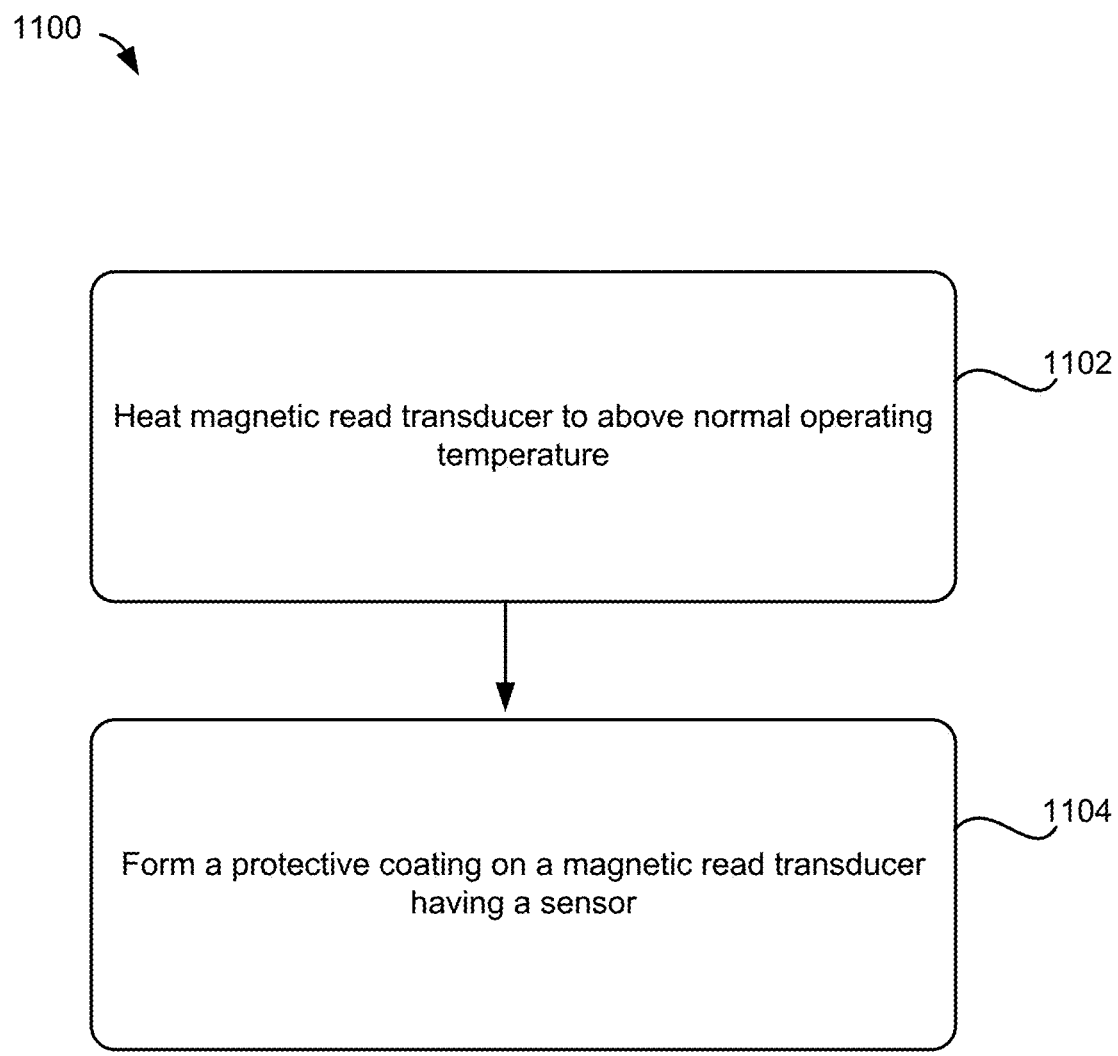
FIG. 11 is a flow chart of a method according to one embodiment.

FIG. 11 depicts a method 1100 for forming an in-situ film, in accordance with one embodiment. As an option, the present method 1100 may be implemented in conjunction with features from any other embodiment listed herein, such as those described with reference to the other FIGS. Of course, however, method 1100 and others presented herein may be used in various applications and/or in permutations which may or may not be specifically described in the illustrative embodiments listed herein. Further, the method 1100 presented herein may be used in any desired environment.

According to one embodiment as shown in FIG. 11, a method 1100 includes operation 1102 in which the read transducer is heated to above a normal operating temperature. In operation 1104, an in-situ film is formed on the magnetic read transducer having a sensor by passing a flexible medium over the transducer at the elevated temperature, where the in-situ film may include material from the flexible medium.

In an exemplary embodiment of method 1100, the material may be formed on the transducer at a temperature that is at least 5° C. above the highest normal reading temperature for the head under normal operating conditions. The normal operating conditions and/or normal operating temperature may correspond to temperature guidelines provided by the manufacturer of the apparatus in which the transducer resides.

In preferred approaches, the level of the current applied to the read transducer may be greater than a normal operation current level used when the magnetic structure is operating for its intended use such that the normal reading temperature of the transducer is raised by at least 5° C. by joule heating.

In some approaches of the method 1100, the material may be formed on the transducer when the temperature of the read transducer is above a glass transition temperature of the medium, for example at a temperature when the binder of the flexible medium becomes transportable.

According to one embodiment of method 1100, the material may be formed only on a media-facing side of the read transducer relative to the rest of the module. In some approaches of method 1100, the material may extend along the media-facing side beyond at least one of the shields in an intended direction of media travel thereacross.

In a tape drive, current may be applied directly to each individual read sensor. The method 1100 may involve applying current to generate heat local to the sensor area. Since the power increases as a square of the current ($P=I^2R$), the heating also increases roughly by the square of the current. The in-situ film on the surface of the flexible medium is sensitive to heat. According to an exemplary embodiment of method 1100, a bias current may be run at a higher value than operating current to elevate the temperature of the read transducer. The optimal current to elevate the temperature of the read transducer may be relative to a particular head having a certain stripe height, track width, resistivity, etc.

Figures 12A, 12B:
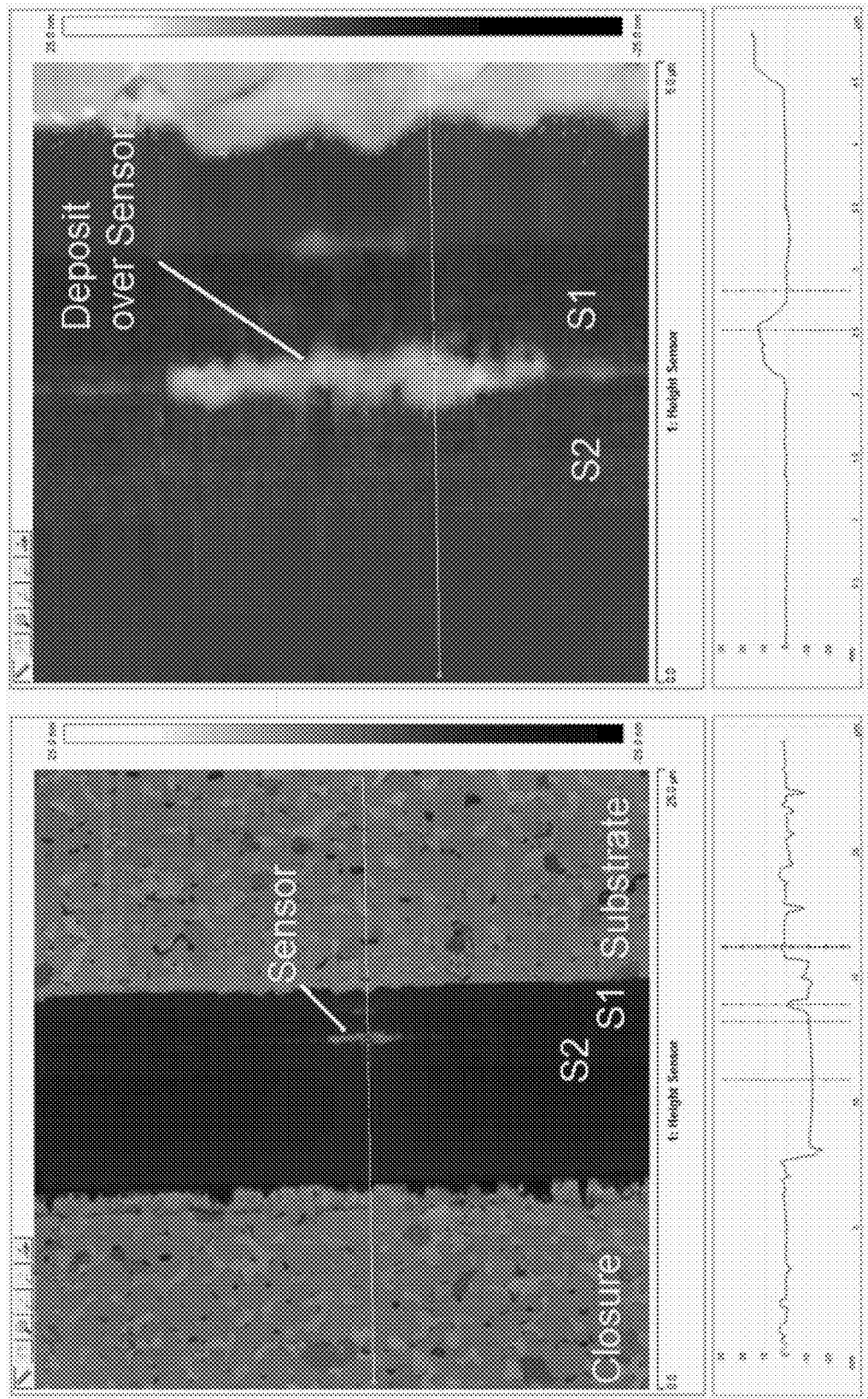
FIGS. 12A-12B are AFM images of a transducer having an in-situ film formed with a current of 5 mA.

FIGS. 12A-12B are atomic-force microscopy (AFM) images that show the topography of a transducer run at a current of 5 mA which is above the typical operating current of 3 mA for this particular magnetic head. FIG. 12A shows the Closure and Substrate with the shields, S1 and S2, and the Sensor. At a bias current of 5 mA, the in-situ film start to form on the Sensor. The graph below FIG. 12A shows the relative topography height of the areas. The recession at shield 2 (S2) and the area near the closure (OC) is at 12.3 nm and 14.2 nm respectively whereas the recession at the sensor (MR) is only 2.2 nm, thus the reduction of recession indicates the formation of material at the sensor.

FIG. 12B is a magnified AFM image of the in-situ film forming on the sensor when the transducer is run at a current of 5 mA. The in-situ film appears to extend along the media facing surface to the edge of the shields (S1 and S2).

Figure 13B:
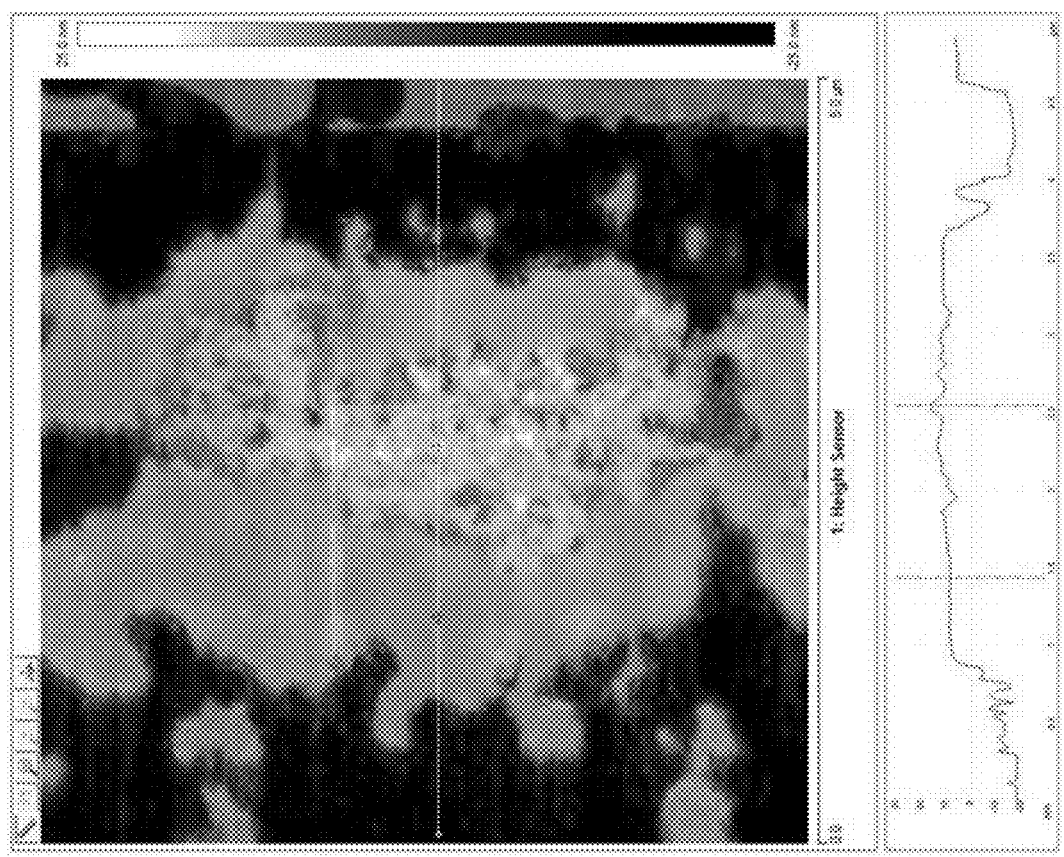
FIGS. 13A-13B are AFM images of a transducer having an in-situ film formed with a current of 7 mA.
Figure 13A:
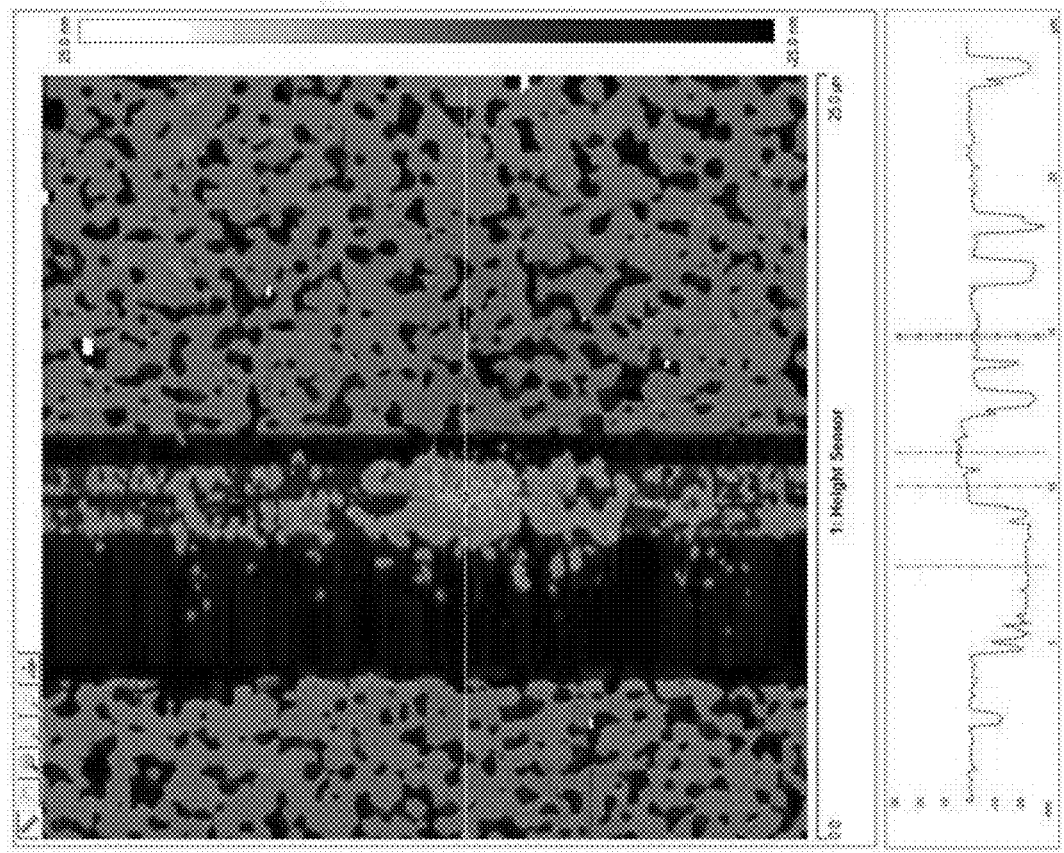

FIGS. 13A-13B are two magnifications of AFM images that show the topography of a transducer run at a current of 7 mA. At the higher bias current of 7 mA, a thick layer of material forms and over the entire sensor and parts of the shields and the hard bias. The higher the temperature, the more the material builds up on the surface and forms a protective cap over the sensor.

From experimental observation, the abrasivity of magnetic recording tape is unable to remove the in-situ film, and over time the in-situ film becomes very resistant to wear by the magnetic recording tape. This material is fairly wear-resistant even in cold and wet environments. In some approaches, if the in-situ film wears away during extensive drive use, the method 1100 may be repeated in the field to generate a new film or replenish the film.

The in-situ film that forms on the sensor may be primarily comprised of magnetic particles fragments and tape lubrication from the flexible medium passing over the transducer. According to one embodiment of method 1100, the material formed on the transducer may include iron oxide.

The thickness of the in-situ film can be adjusted by adjusting the temperature, the length of medium running over time and/or type of medium used to form the in-situ film.

In one embodiment of method 1100, a media-facing side of the transducer may be recessed from a plane of a tape bearing surface of a substrate upon which the transducer is formed. Moreover, the material may be formed on the media-facing side of the transducer until the in-situ film has a desired thickness, e.g., extending up to the plane. In some approaches, the in-situ film may have a thickness of at least 5 nm.

In conventional tape heads, an alumina coating may be present on the media facing surface of the transducer and the areas thereabout to protect the tape head from degradation. In one embodiment of method 1100, the material may be formed above an alumina coating on the read transducer. In other approaches, the sensor can be masked during manufacture so that the alumina coating is only present on the non-sensor surfaces of the tape head. Then the in-situ film described herein may be formed directly on the sensor that does not have alumina coating by raising the temperature of the transducer while running a flexible medium over the media facing surface of the transducer.

In use, an in-situ film may be added to magnetic read transducers in the field using the methodology described herein. Using either a conventional magnetic data tape medium or a special tape designed to create a primarily iron oxide in-situ film, the tape could be run over an array of transducers. The current for an array of transducers, or single transducers, may be adjusted to a bias current that raises the temperature of the transducer at least 5° C. above the operating temperature of the transducer to form an in-situ film on the heated transducer. Thereafter, the bias current may be lowered to operating temperature to perform the read function of the transducer.

Figure 14:
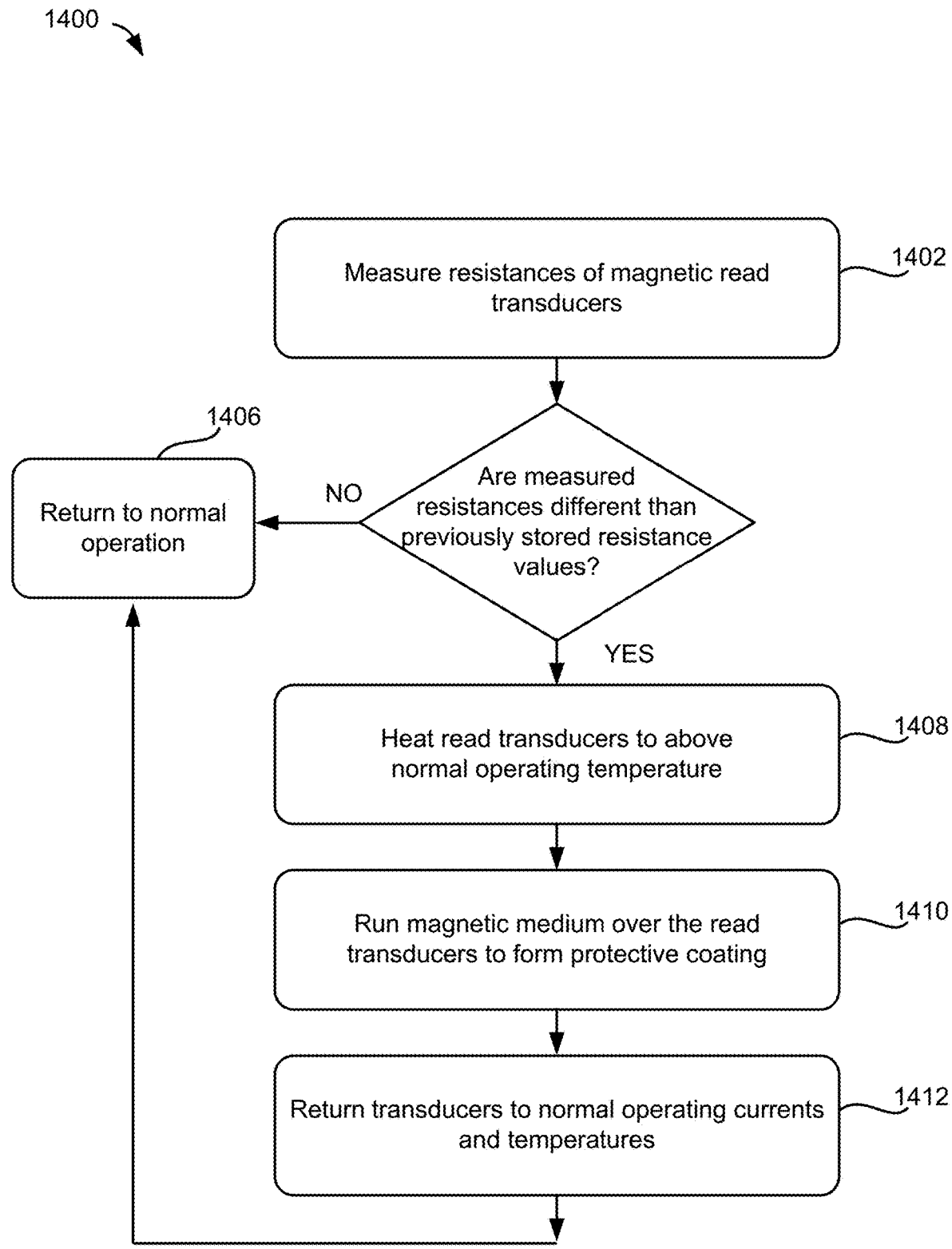
FIG. 14 is a flow chart of a method according to one embodiment.

FIG. 14 depicts a method 1400 for forming an in-situ film, in accordance with one embodiment. As an option, the present method 1400 may be implemented in conjunction with features from any other embodiment listed herein, such as those described with reference to the other FIGS. Of course, however, method 1400 and others presented herein may be used in various applications and/or in permutations which may or may not be specifically described in the illustrative embodiments listed herein. Further, the method 1100 presented herein may be used in any desired environment.

In method 1400, resistances are used to determine if a protective coating thereon has been worn off or depleted, and if so, an in-situ film is formed. The method may be performed by the drive directly, by a computer passing instructions to the drive, by a user controlling the tape drive, etc.

In operation 1402, resistances of read transducers are measured. Any known technique may be used. For example, the controller of the drive may pass a read current through the sensor and measure the resistance of the sensor.

When the coating is depleted, the sensor tends to wear, which in turn increases resistance thereacross. Accordingly, in operation 1404, the measured resistances are compared to previously stored resistance values, which may be retrieved from a table, from memory, etc. The comparison may be on a per-read-transducer basis, using averages of the past and present resistance values, etc.

In operation 1406, in response to determining that the measured resistances have not significantly changed from the previously stored resistance values, e.g., are within 10% of the previously stored values or within some predefined range, the drive returns to normal operation.

In response to determining that the measured resistances have significantly changed from the previously stored resistance values, an in-situ film may be formed and/or replenished via operation 1408 which includes heating the read transducers above a normal operation temperature, and operation 1410 which includes running a flexible medium over the transducers for forming an in-situ film thereon. Then operation 1412 returns the transducers to normal operating currents and temperatures and the method 1400 returns to operation 1406.

In a preferred embodiment of a magnetic tape designed for presently disclosed techniques of forming the in-situ film, the flexible medium may be a tape where the concentration of lubricant is increased and the wear particles may be reduced relative to conventional data tapes.

In other uses, if a drive is in a library, the in-situ film may be applied in an off-line operation. The in-situ film may be applied until the readback signal shows that the spacing compares to the spacing of the head at time zero or at some point in transition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising,
   forming a wear-resistant in-situ film on a magnetic read transducer having a sensor with magnetic shields,
   the in-situ film including material derived from a flexible medium,
   wherein the material is formed on the transducer by passing the flexible medium over the transducer at an elevated temperature above normal reading temperature.

2. A method as recited in claim 1, wherein the material is formed on the read transducer at a temperature that is at least 5° C. above normal reading temperature.

3. A method as recited in claim 1, wherein the temperature of the read transducer is elevated to above a glass transition temperature of the medium.

4. A method as recited in claim 1, wherein the material is created only on a media-facing side of the read transducer.

5. A method as recited in claim 1, wherein a bias current is run at a higher value than operating current to elevate the temperature of the read transducer.

6. A method as recited in claim 1, wherein the material is comprised of iron oxide.

7. A method as recited in claim 1, wherein a media-facing side of the read transducer is recessed from a plane of a tape bearing surface of a substrate upon which the read transducer is formed, wherein the material is formed on the media-facing side of the read transducer until the in-situ film has a thickness extending to the plane.

8. A method as recited in claim 1, wherein the material is formed above an alumina coating on the read transducer.

9. A method as recited in claim 8, wherein the material is above the read transducer, wherein the alumina coating is not present between the read transducer and the material.

10. A method as recited in claim 1, wherein the in-situ film has a thickness of at least 5 nm.

11. A method as recited in claim 1, wherein the material is formed along a media-facing side of the read transducer beyond at least one of the shields in an intended direction of media travel thereacross.

12. A method as recited in claim 1, wherein the material is formed along a media-facing side of the read transducer no further than the shields in an intended direction of media travel thereacross.

13. The method of claim 1, wherein the read transducer is one of an array of read transducers, wherein the in-situ film is on media-facing sides of the read transducers.

14. A method, comprising,
   determining resistances of read transducers;
   comparing the determined resistances to previously-stored resistance values; and
   in response to determining that the measured resistances have significantly changed from the previously-stored resistance values, causing the read transducers to be heated to above a normal operation temperature, and causing a flexible medium to run over the read transducers for forming an in-situ film on the read transducers.

15. The method as recited in claim 14, wherein the read transducers are heated to a temperature that is at least 5° C. above normal reading temperature.

16. The method as recited in claim 14, wherein the in-situ film is formed only on a media-facing side of the read transducer.

17. The method as recited in claim 14, wherein causing the read transducers to be heated to above a normal operation temperature comprises running a bias current at a higher value than operating current to elevate the temperature of the read transducer.

18. The method as recited in claim 14, wherein the in-situ film is comprised of iron oxide.

19. The method as recited in claim 14, wherein the in-situ film is formed above an alumina coating on the read transducer.

20. The method as recited in claim 14, wherein the in-situ film as a thickness of at least 5 nanometers.

* * * * *